Feb. 14, 1956   M. L. BENJAMIN   2,734,749
MULTIPLE SLEEVE EXPANDABLE MANDREL
Filed June 29, 1951
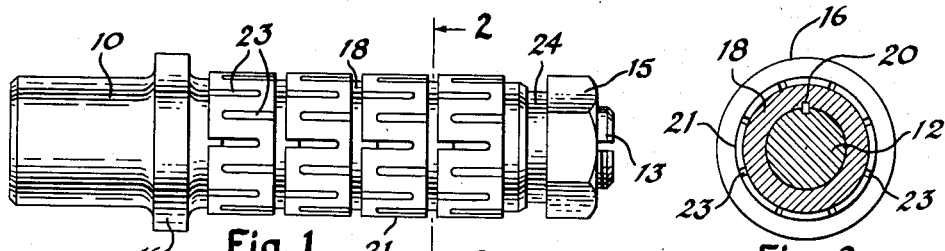
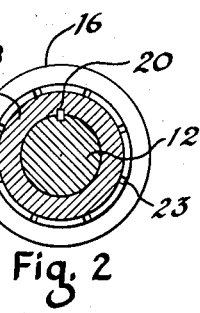
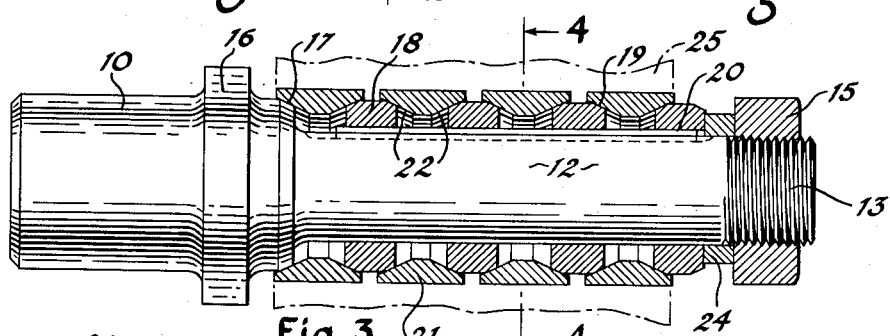
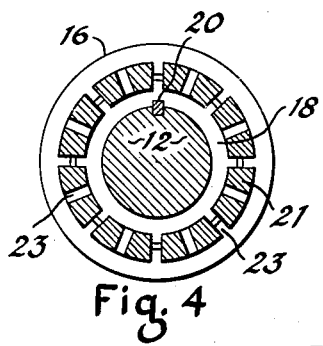
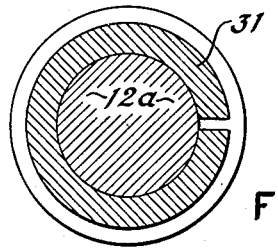
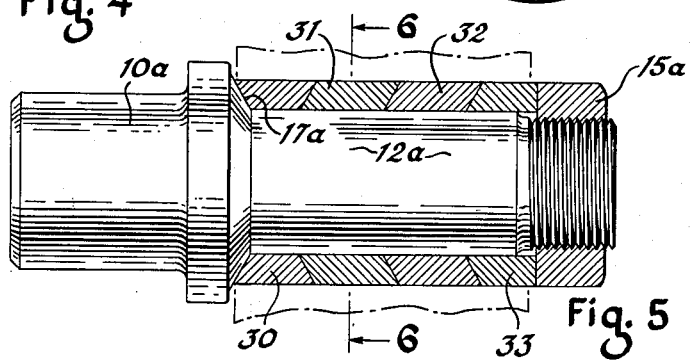
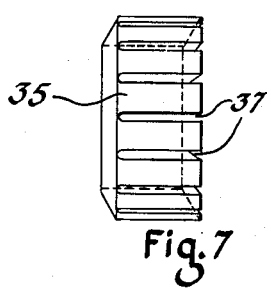
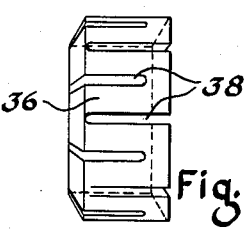
INVENTOR.
Milton L. Benjamin
BY
Hyde, Meyer, Baldwin, & Doran
ATTORNEYS United States Patent Office 2,734,749
Patented Feb. 14, 1956

2,734,749

MULTIPLE SLEEVE EXPANDABLE MANDREL

Milton L. Benjamin, Shaker Heights, Ohio

Application June 29, 1951, Serial No. 234,347

9 Claims. (Cl. 279—2)

The invention relates to novel and improved expandable mandrels for holding work pieces having a bore of cylindrical contour.

An object of the invention is to provide an expandable mandrel of materially improved retaining and gripping power.

A further object of the invention is to provide a mandrel of the character defined in the last preceding paragraph whereby the frictional gripping force is effective over a zone of substantial extent, longitudinally, and practically commensurate with the length of the work piece.

A further object of the invention is to provide an expandable mandrel which affords greater accuracy and gripping power at lower cost than heretofore available.

A further object of the invention is to provide an expandable mandrell whereby the gripping effect may be very rapidly applied and released, and which is readily adaptable to bores of varying diameters.

Another object of the invention is to provide an expandable mandrel wherein the cylindrical plane which includes the zones of frictional grip is accurately aligned with the axis of the spindle, or other holding or rotating means.

Other objects and advantages of the invention will be apparent from a study of the following description, in conjunction with the accompanying drawings, in which Fig. 1 is a plan view of one embodiment of an expandable mandrel embodying my invention.

Fig. 2 is a transverse sectional view taken approximately on the line 2—2 of Fig. 1.

Fig. 3 is a longitudinal sectional view slightly enlarged, taken axially through the mandrel. Fig. 4 is a transverse sectional view taken on the line 4—4 of Fig. 3. Fig. 5 is a longitudinal sectional view taken axially through a somewhat modified embodiment of the invention. Fig. 6 is a transverse sectional view taken on the line 6—6 of Fig. 5. Figs. 7 and 8 are side elevational views of two types of spring collar usable with the mandrel of Fig. 5.

Those skilled in the arts of shaping the exterior sur faces of work pieces by mechanical turning operations are familiar with the desirability of improving the accuracy and gripping power of the means for holding the work piece. When such work piece is provided with an axial bore, and the periphery of the work piece is to be machined or ground to a cylindrical contour, the work piece is usually fixed on a mandrel, an end of the mandrel being usually gripped in a chuck or other related device rotatable from a power source. When a plurality of identical operations are to be performed in succession it is especially convenient to provide a mandrel having one or more elements which are expandable outwardly by adjusting means, so that the said elements frictionally grip the inner wall of the bore in the work piece. It is, of course, highly to be desired that said expandable mandrel exert a tight enough grip to insure secure holding of the work for close tolerance machining or finishing, and that the grip be easily releasable for quick change operations. It is further desirable that a single mandrel be able to accommodate a reasonably wide range of bore dimensions, and that the central solid portion of the mandrel shaft be of large enough diameter to rigidly resist deformation even when large cuts are being taken on the work, or off-center metal working force is being otherwise applied.

The expandable mandrel now to be described exhibits the foregoing advantageous characteristics to an outstanding degree.

Referring first to Figs. 1 to 5, I show a mandrel of the cantilever type having a shank end 10 adapted to be received in a lathe chuck, or other gripping means whereby rotary motion can be imparted thereto. Integral with the shank end is a spindle 12 having at its free end a threaded portion 13 for the reception of a securing and adjusting nut 15. The shank and spindle portions have therebetween an annular enlargement 16 which tapers irregularly downwardly towards the spindle whereby to provide a conically beveled shoulder 17 for a purpose which will soon appear.

The spindle carries a plurality of annular members 18 herein for convenience termed expander rings. The outer peripheral edges of each expander ring are conically beveled at 19, as best seen in Fig. 3. The expander rings have a sliding fit on the spindle, and each ring is keyed to the spindle by a single long key 20 which, of course, permits axial movement, but not rotation of the rings. A flexibly expandable sleeve ring 21 is carried upon adjacent shoulders 19 of each pair of expander rings, and between the inner expander ring and shoulder 17. The sleeve rings have their inner peripheral edges 22 conically beveled to be complementary to the outer peripheral beveled edges of the supporting expander rings.

The sleeve ring has been termed flexibly expandable, deriving this characteristic from a series of through slots 23 extending inwardly alternately from opposite directions. It will be apaprent that if an inwardly directed force is applied to the expander rings 18, for example, through the spacer washer 24 by means of adjusting nut 15, the coacting beveled surfaces 19, 22, of the rings and sleeves force the sleeves radially outwardly so that they grip the work piece 25 shown in broken outline in Fig. 3. The imaginary cylindrical plane coincident with the outer peripheries of sleeves 21 is automatically self-adjusting to the inner wall of the work piece bore. If desired, the mandrel may be subjected to an average end thrust by means of nut 15, after which the outer surfaces of the rings may be ground to a true cylindrical periphery under such end thrust. This assures a greater area of accurate planar contact with the work piece bore wall under end thrusts approximating that at which the periphery of the mandrel was ground.

The provision of a multiplicity of sleeves in tandem, spaced arrangement, as shown, gives a multiplication of wedge action without an inordinate build-up of frictional losses. With a 45 degree bevel at the mating faces of the sleeves and rings, there is a ratio of 2 to 1, and with four sleeves as shown in Figs. 1 and 3 the ratio would be 8 to 1, that is to say the outward gripping force is eight times that of a single sleeve, excluding loss from friction. With solid rings 18, and with a multiplicity of rings and sleeves, the sleeves may be made quite thin, so that the spindle 13 may be of greater diameter and strength than usual.

A plurality of work pieces, each of limited length, may be supported on a single mandrel. This, of course, cannot be done when only one expanding member is used. The provision of a longitudinally extended series of gripping zones in one work piece gives greater accuracy and gripping power.

The mandrel was characterized as being of the cantilever type. It could obviously be supported between centers, or in any way familiar to machinists.

Figs. 5 and 6 show another embodiment of an expandable mandrel which is of cheaper and simpler construction than that previously described. As before, it includes a shank 10a and a spindle 12a, there being an intermediate annular boss having a tapered shoulder 17a. A plurality of split rings 30, 31, 32, 33 are assembled on the spindle in operative sliding contact with the spindle and with each other. The end faces of each of rings 30, 31 and 32 are beveled in complementary relationship with the contacting end faces of the adjacent contacting element, the wedge angle being such as to expand the rings radially outwardly when inward thrust is applied by nut 15a. The inner end face of ring 33 is also beveled, but the outer end face is faced off to give planar contact with the inner face of nut 15a. While not thus shown, the contacting faces of the nut 15a and ring 33 could have a beveled or conical contour. All faces herein termed "beveled" are frusto-conical in contour. As here shown rings 30, 31, and 32 will be expanded outwardly by inward end thrust of nut 15a against ring 33. The elimination of the expander rings of the previous embodiment reduces the cost, and the shank 12a can be made of larger diameter accordingly.

Figs. 7 and 8 show expandable members 35 and 36 respectively, which can be substituted for example for rings 31 and/or 32 in Fig. 5. Ring 35 has a plurality of spaced slots 37 extending inwardly from the right end face, but not completely through the ring. Ring 36 has a plurality of slots 38 extending alternately from opposite directions. With suitable modification either one of the rings 30 and 33 of Fig. 5 could be slotted either in the fashion of Fig. 7 or of Fig. 8.

One commercial embodiment of the mandrel just described is capable of a diametrical expansion of $\frac{1}{32}''$. One such mandrel can accommodate a wide variety of sleeves, thus being adaptable to a wide range of work piece bores. Production time is saved by its quick release feature, and it permits more accurate and firmer interior gripping of bored parts such as bushings, bearings, gears, cylinders, projectiles, and the like.

What I claim is:

1. An expandable mandrel for holding a work piece having a generally cylindrical bore comprising a spindle, a shank portion at one end of said spindle adapted to be retained by rotatable, power-energized means, a threaded tip portion near the other end of said spindle, a shouldered abutment flange on said spindle near said shank end, a plurality of solid expander rings disposed in spaced relationship along said spindle and adapted to have limited endwise sliding movement thereon, the outer peripheral edges of each said ring being divergently beveled away from the peripheral edge face of the ring, a plurality of expandable sleeves surrounding said spindle in spaced relationship longitudinally of the spindle, each said sleeve being transversely slotted to permit ready expansion from idle position each such sleeve being contractably biased to a nested support on and between two adjacent rings, the interior peripheral edges of each sleeve being conically beveled so that each such beveled edge of a sleeve seats upon and is conically complementary to the adjacent one of the aforesaid beveled edges of the supporting ring, a threaded nut on said tip adapted, by advance rotation thereon, to apply end thrust to the adjacent one of said rings, said end thrust being adapted, by mutual approach motion of said rings transmitted through contact with said sleeves at said complementary beveled edges, to cause said sleeves to expand radially outwardly responsive to said end thrust.

2. An expandable mandrel as defined in claim 1 wherein each said expandable sleeve is provided with a plurality of circumferentially spaced slots each extending from a side face part way towards the opposite side face.

3. An expandable mandrel as defined in claim 2 wherein said circumferentially spaced slots extend inwardly alternately from opposite side faces.

4. Clamping means for gripping an element having a generally cylindrical surface to be gripped, comprising a body member being adapted to be rotated by power-energized means, said body member having a shouldered abutment and a threaded portion spaced apart and joined by a cylindrical surface having a uniform cross sectional area, a plurality of expander rings telescoped with and in spaced axial relationship along said cylindrical surface of said body member and adapted to have limited axial sliding movement thereon, the opposite axially spaced edges of each ring remote from said body member cylindrical surface being conically beveled, a plurality of axially spaced sleeves, each said sleeve being designed to radial change in size from idle position so as to be engageable with the cylindrical surface of said element, each such sleeve being located between adjacent rings and being conically beveled to be complementary to said bevels on said adjacent rings, and a nut on said threaded portion adapted by advance rotation to apply end thrust to said rings, said end thrust being adapted by mutual approach motion of said rings transmitted through contact with said sleeves at said complementary conical beveled edges to cause said sleeves to change size radially sufficiently to grip firmly said element responsive to said end thrust while said rings are adapted by sufficient clearance therebetween to freely slide along the cylindrical surface of said body member when said element is gripped.

5. Clamping means for gripping an element having a generally cylindrical surface to be gripped, comprising a body member being adapted to be rotated by power-energized means, said body member having a shouldered abutment and a threaded portion spaced apart and joined by a cylindrical surface having a uniform cross sectional area, a plurality of expander rings telescoped with and in spaced axial relationship along said cylindrical surface of said body member and adapted to have limited axial sliding movement thereon, the opposite axially spaced edges of each ring remote from said body member cylindrical surface being conically beveled, a plurality of axially spaced sleeves, each said sleeve being designed to radial change in size from idle position so as to be engageable with the cylindrical surface of said element, each such sleeve being located between adjacent rings and being conically beveled to be complementary to said bevels on said adjacent rings, a nut on said threaded portion adapted by advance rotation to apply end thrust to said rings, said end thrust being adapted by mutual approach motion of said rings transmitted through contact with said sleeves at said complementary conical beveled edges to cause said sleeves to change size radially responsive to said end thrust while said rings are adapted to slide along the cylindrical surface of said body member, each of said sleeves having a greater radial change in size for a given end thrust than its adjacent expander ring so that said end thrust will cause said sleeves to change radially in size sufficient to grip said element while still permitting said expander rings to telescope axially along said body member cylindrical surface in response to said end thrust.

6. A clamping means as set forth in claim 5, including axially extending keying means between said body member and expander rings for preventing relative rotation between said body member and expander rings but permitting free axial movement therebetween.

7. Clamping means for gripping an element having a generally cylindrical surface to be gripped, comprising a body member being adapted to be rotated by power-energized means, said body member having a shouldered abutment and a threaded portion spaced apart and joined by a cylindrical surface having a uniform cross sectional area, a plurality of expander rings telescoped with and in spaced axial relationship along said cylindrical surface of said body member and adapted to have limited axial sliding movement thereon, the opposite axially spaced edges of each ring remote from said body member cylindrical surface being conically beveled, a plurality of axially spaced sleeves, each said sleeve being designed to radial change in size from idle position so as to be engageable with the cylindrical surface of said element, each such sleeve being located between adjacent rings and being conically beveled to be complementary to said bevels on said adjacent rings, a nut on said threaded portion adapted by advance rotation to apply end thrust to said rings, said end thrust being adapted by mutual approach motion of said rings transmitted through contact with said sleeves at said complementary conical beveled edges to cause said sleeves to change size radially responsive to said end thrust while said rings are adapted to slide along the cylindrical surface of said body member, each ring being of solid construction and each sleeve being axially slotted.

8. Clamping means for gripping an element having a generally cylindrical surface to be gripped, comprising a body member being adapted to be rotated by power-energized means, said body member having a shouldered abutment and a threaded portion spaced apart and joined by a cylindrical surface having a uniform cross sectional area, a plurality of expander rings telescoped with and in spaced axial relationship along said cylindrical surface of said body member and adapted to have limited axial sliding movement thereon, the opposite axially spaced edges of each ring remote from said body member cylindrical surface being conically beveled, a plurality of axially spaced sleeves, each said sleeve being designed to radial change in size from idle position so as to be engageable with the cylindrical surface of said element, each such sleeve being located between adjacent rings and being conically beveled to be complementary to said bevels on said adjacent rings, a nut on said threaded portion adapted by advance rotation to apply end thrust to said rings, said end thrust being adapted by mutual approach motion of said rings transmitted through contact with said sleeves at said complementary conical beveled edges to cause said sleeves to change size radially responsive to said end thrust while said rings are adapted to slide along the cylindrical surface of said body member, the rings and sleeves being constructed of material having generally the same resistance to radial deformation.

9. Clamping means for gripping an element having a generally cylindrical surface to be gripped, comprising a body member being adapted to be rotated by power-energized means, said body member having a shouldered abutment and a threaded portion spaced apart and joined by a cylindrical surface having a uniform cross sectional area, a plurality of expander rings telescoped with and in spaced axial relationship along said cylindrical surface of said body member and adapted to have limited axial sliding movement thereon, the opposite axially spaced edges of each ring remote from said body member cylindrical surface being conically beveled, a plurality of axially spaced sleeves, each said sleeve being designed to radial change in size from idle position so as to be engageable with the cylindrical surface of said element, each such sleeve being located between adjacent rings and being conically beveled to be complementary to said bevels on said adjacent rings, a nut on said threaded portion adapted by advance rotation to apply end thrust to said rings, said end thrust being adapted by mutual approach motion of said rings transmitted through contact with said sleeves at said complementary conical beveled edges to cause said sleeves to change size radially responsive to said end thrust while said rings are adapted to slide along the cylindrical surface of said body member, an axially extending non-circular portion between said body member and expander rings for preventing relative rotation between said body member and expander rings but permitting free axial movement therebetween.

References Cited in the file of this patent

UNITED STATES PATENTS

| | | |
|---|---|---|
| 442,230 | Libby | Dec. 9, 1890 |
| 1,044,299 | Trundle | Nov. 12, 1912 |
| 1,316,709 | Gray | Sept. 23, 1919 |
| 1,448,987 | Spalding et al. | Mar. 20, 1923 |
| 1,964,237 | Wheeler | June 26, 1934 |
| 2,499,781 | Rothenberger | Mar. 7, 1950 |
| 2,573,928 | Peter | Nov. 6, 1951 |

FOREIGN PATENTS

| | | |
|---|---|---|
| 21,450 | Great Britain | 1906 |